United States Patent
Shaburov et al.

(10) Patent No.: US 7,962,892 B2
(45) Date of Patent: Jun. 14, 2011

(54) DESIGNTIME SERVICES FOR MULTIPLE PATTERNS

(75) Inventors: Victor Shaburov, Leimen (RU); Ulf Fildebrandt, Oftersheim (DE); Vinay Nath Penmatsa, Bangalore (IN)

(73) Assignee: SAP AG, Walldorf (DE)

( * ) Notice: Subject to any disclaimer, the term of this patent is extended or adjusted under 35 U.S.C. 154(b) by 1120 days.

(21) Appl. No.: 11/648,303

(22) Filed: Dec. 28, 2006

(65) Prior Publication Data
US 2008/0163161 A1    Jul. 3, 2008

(51) Int. Cl.
G06F 9/44 (2006.01)
(52) U.S. Cl. .......................... 717/105; 717/113
(58) Field of Classification Search .......... 717/104–105, 717/110–113, 120–123
See application file for complete search history.

(56) References Cited

U.S. PATENT DOCUMENTS

| | | | |
|---|---|---|---|
| 5,826,257 A | 10/1998 | Snelling, Jr. | |
| 6,249,905 B1 | 6/2001 | Yoshida et al. | |
| 6,434,568 B1 | 8/2002 | Bowman-Amuah | |
| 6,437,805 B1 | 8/2002 | Sojoodi et al. | |
| 6,539,396 B1 | 3/2003 | Bowman-Amuah | |
| 6,983,421 B1 | 1/2006 | Lahti et al. | |
| 7,120,876 B2 | 10/2006 | Washington et al. | |
| 2002/0026441 A1 | 2/2002 | Kutay et al. | |
| 2002/0026461 A1 | 2/2002 | Kutay et al. | |
| 2002/0199025 A1 | 12/2002 | Kutay et al. | |
| 2004/0001092 A1 | 1/2004 | Rothwein et al. | |
| 2004/0017392 A1 | 1/2004 | Welch | |
| 2004/0036719 A1 | 2/2004 | Van Treeck | |
| 2004/0193579 A1 | 9/2004 | Dettinger et al. | |
| 2004/0268228 A1 | 12/2004 | Croney et al. | |
| 2005/0055667 A1 | 3/2005 | Beringer et al. | |
| 2005/0149206 A1* | 7/2005 | Krane | 700/17 |
| 2005/0257157 A1 | 11/2005 | Gilboa et al. | |
| 2005/0257210 A1* | 11/2005 | Stienhans et al. | 717/170 |

OTHER PUBLICATIONS

Netscape Communications, "Netscape Application Builder—User's Guide", 1999, Netscape Communications corp., Chapters 1-10, 254 pages.*

Jan Newmarch, "Java 1.1 Event Handling—Draft", Feb. 1996, retrieved from http://jan.newmarch.name/java/, 19 pages.*

* cited by examiner

*Primary Examiner* — Ted T Vo
(74) *Attorney, Agent, or Firm* — Mintz, Levin, Cohn, Ferris, Glovsky and Popeo, P.C.

(57) ABSTRACT

Methods and apparatus, including computer program products, related to designtime services for multiple patterns of a visual modeling language environment (e.g., generic services to handle events related to pattern components in a designtime environment). Input characterizing events related to patterns components may be received in a visual modeling tool, a type of event may be associated with a service to resolve events related to different patterns having a same type of event, and the service may be initiated to resolve the type of event.

14 Claims, 14 Drawing Sheets

FIG. 14

1405
```
$ENV.defineListener({type:'canRemoveElement', func:function(evt) {
```

1410
```
  if (evt.child.isa('gml:Link')) {
    if ($ENV.contextElement && $ENV.contextElement.isa('gml:Link')) {
      if ($ENV.contextElement == evt.child) {
        var target = evt.child.getProperty('target').parent;
        if (target.isa('#NS[PatternInteractor]')) {
          PROMPT("Target configuration will be lost. Please remove the target first.");
          evt.cancel = true;
        }
        if (evt.unit.canRemoveLink) evt.unit.canRemoveLink(evt);
      }
    }
    return;
  }
```

1415
```
  var elementRole = evt.child.roleName;
  if(!elementRole || !evt.unit) return;
```

1420
```
  var discovery = $ENV.getHelper('#NS[PatternDiscovery]');
  var currentUnit = evt.unit;
  var chidrenInRole = discovery.getChildElementsByRole(elementRole, currentUnit);
  var minCardinality = discovery.getMinCardinality(elementRole, currentUnit.Class.fullname);

if(INT(minCardinality) == 0) return;
```

1425
```
  if(chidrenInRole.length <= INT(minCardinality)) {
    evt.cancel = true;
    PROMPT("Cannot remove " + elementRole);
    return;
  }
```

1430
```
  if(evt.unit && evt.unit.canRemoveElement) {
    evt.unit.canRemoveElement(evt);
  }
}});
```

DESIGNTIME SERVICES FOR MULTIPLE PATTERNS

BACKGROUND

The present disclosure relates to data processing by digital computer in a visual modeling language environment, and more particularly to pattern-generic services in a visual modeling language environment.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

A structured approach to developing applications includes a model-driven tool such as VISUAL COMPOSER, which is a visual modeling program manufactured by SAP AG of Walldorf (Baden), Germany (SAP). A tool like the VISUAL COMPOSER allows a developer to compose applications in a flexible way by using patterns. A pattern graphically depicts functional components (e.g., entities of a modeling language) as drag-and-drop services, and a data flow definition between them. A pattern (sometimes referred to as a UI pattern) is a configurable, reusable unit designed to let users accomplish a specific but generically-defined task, such as searching for business objects, and editing the objects that are retrieved. Generally, each pattern has a specific semantic meaning and defined interaction behavior. In some implementations, a pattern can include a predefined arrangement of UI elements. Using patterns promotes uniform design throughout an application or group of applications because similar tasks are represented and handled in the same manner. For example, a user can always search in the same way, whether searching for a sales order, a business partner, or a product. User interface patterns can be defined at various levels, and can be nested within each other, thus creating hierarchies of patterns. At the top level of the hierarchy, a pattern can act as a "floor plan" for a user interface that is designed to help end-users complete a specific business process.

A visual modeling language environment can have a separation between a designtime and a runtime version of an application. A designtime version of an application can include a combination of patterns and configuration of properties of those patterns that can define an application being developed. Underlying a designtime version of an application can be a model of the application, which can be an implementation-independent model (e.g., a model in accordance with a Universal Modeling Language (UML) specification) or a more implementation-specific model (e.g., a model in accordance with a programming language, such as the JAVA programming language from SUN MICROSYSTEMS, INC. of Santa Clara, Calif.). A runtime version of an application can be generated by a visual modeling program based on a designtime version of the application, with the use of a model underlying the designtime version of the application. For example, a designtime version of an application can be used to devise a model with JAVA classes and, the JAVA classes can be compiled to generate a JAVA runtime version of an application.

SUMMARY

The subject matter disclosed herein provides methods and apparatus, including computer program products, that implement techniques related to pattern-generic services in a visual modeling language environment.

Input characterizing a first event may be received, where the first event is related to a first pattern component of a visual modeling language environment. The first event may be associated with a service for a type of event associated with the first event, and the service may be caused to resolve the first event. Input characterizing a second event may be received where the second event relates to a second pattern component of the visual modeling language environment. The second event may be associated with the service (the same service associated with the first event), where the second event is the same type of event as the first event, and the service may be caused to resolve the second event.

A computer-implemented event-listener may receive input characterizing events related to patterns components in a visual modeling tool, associate a type of event with a service to resolve events, and initiate the service to resolve the type of event. The service may resolve events related to different patterns having a same type of event.

The subject matter may be implemented as, for example, computer program products (e.g., as source code or compiled code), computer-implemented methods, and systems.

Variations may include one or more of the following features.

Pattern components may be implemented in kits having similar extension points. A service may resolve events from extension points of pattern components.

A service may determine child components supported by a pattern component in response to an event, and configure a palette of pattern components to include child components supported by the pattern component. A pattern component may be added as a child to another pattern component, where the pattern component is one of the child components supported by the other component. A service may determine whether cardinality information supports another pattern component as a child (e.g., another instance of a pattern), and if so, allow a user to add another pattern component as a child to a pattern component.

Events may be received at an event listener that assists in resolving events of pattern component kits. Each pattern component kit may have a pattern component that may be added or removed from a visual modeling environment and the event listener may reference the service to assist in resolving the events.

An indication of a kit including a pattern component may be received. The kit might not include an event handler for the event, and the kit may be integrated into a visual modeling environment. The kit may include code overwriting a another service for handling another event, where the other service is a generic service for handling the other event and kit may be integrated into the visual modeling environment.

An event may be received by a visual modeling tool in a designtime environment to develop an application using pattern components.

A pattern component may graphically depict an entity of a visual modeling language. A pattern component may be a configurable, reusable unit corresponding to a task, and having a specific semantic meaning and defined interaction behavior.

The subject matter described herein can be implemented to realize one or more of the following advantages. Instance-based event handling may be used for a designtime environment of a visual modeling tool, which may provide a central place for implementing generic logic and may improve reliability of pattern kits as there may be less risk that multiple developers introduce conflicting global event handlers into a same environment (e.g., as global event handlers need not exist). Global event handlers need not be used to handle events, such that information about implementing global event handlers need not be known to develop pattern kits. A same service may resolve a same type of event from different patterns (e.g., instances of different types of patterns) in a designtime environment. By having a same service, which may be referred to as a generic service, resolve events from different patterns, required code for implementing patterns may be reduced, as specific event resolution procedures need not be implemented for all patterns. Also, a visual modeling environment may be self-adaptable to new pattern kits, as those kits may rely on the generic services to resolve events. Generic services may be overwritten such that, for example, patterns that require a service different from a generic service may have a specific service and that service need not interfere with the generic service being provided for other patterns. Roles, interfaces, and cardinality information may be implemented with generic services. For example, a generic service to resolve an event related to configuring a palette of patterns may use interface and cardinality information to determine how to resolve events such that, for example, a pattern may be introduced into a designtime environment and the generic service need not be adapted for the pattern. Business requirements may be generically implemented with roles and interfaces. For example what is or is not displayed in a palette or in a context menu may be a business requirement for application developers. By defining roles for components and implementing appropriate interfaces, the business requirements may be reflected visually through generic services and specific code need not be introduced into pattern components.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 14 is a pseudo-code example of a generic service for pattern components in a designtime environment.

Like reference numbers and designations in the various drawings indicate like elements.

DETAILED DESCRIPTION

Figure 1:
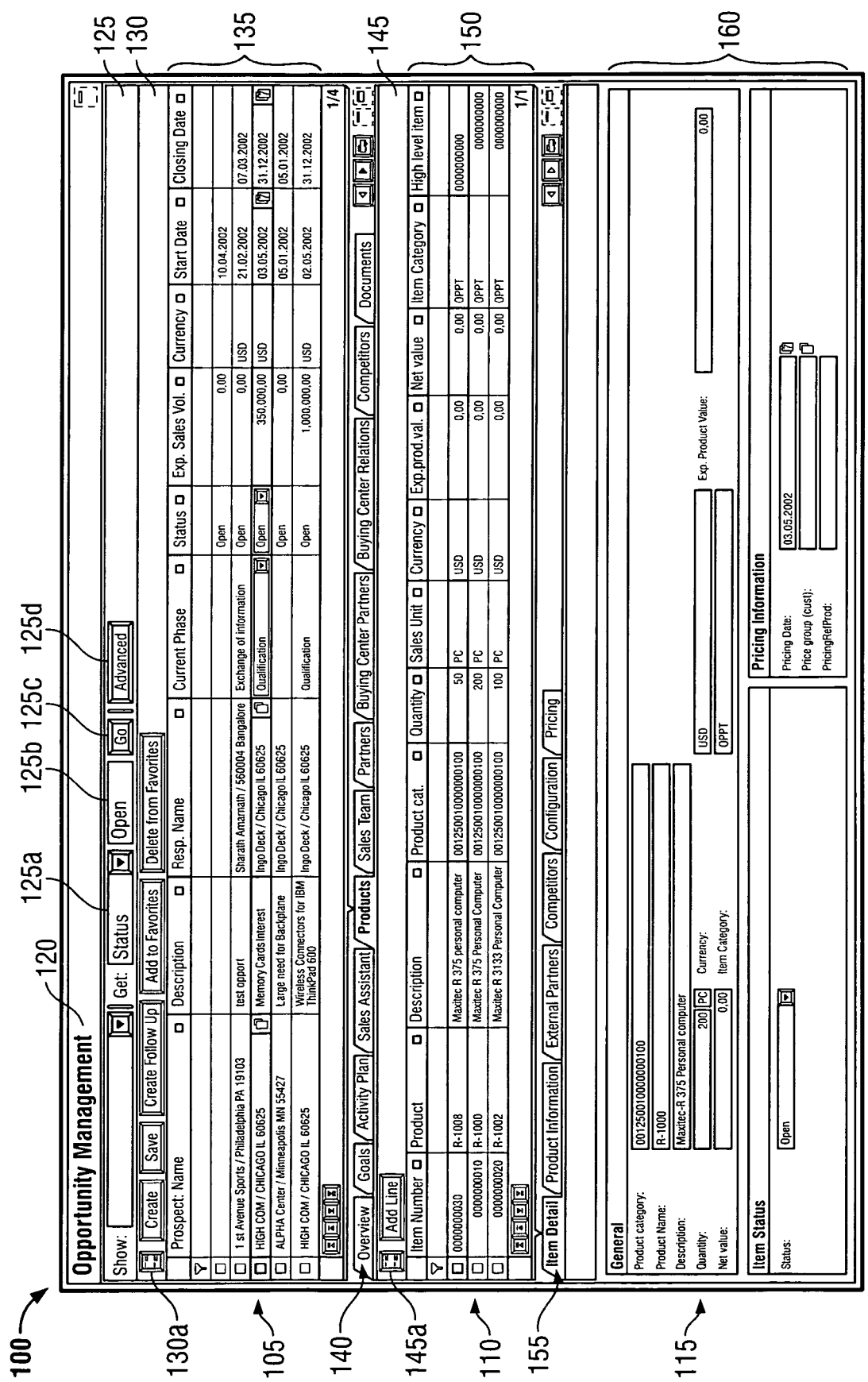
FIG. 1 is a screenshot of a user interface.

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

As an example use of patterns, a floor plan for a user interface can specify that an application screen is to be divided into three sections, with a top section for searching for and selecting business objects, a middle section for showing the details of an object selected in the top section, and a bottom section for showing the details of a sub-object of the object in the middle section. More detailed, lower-level patterns can be used for each of the sections specified in a floor plan. For example, that a section of the screen is to include a search bar with various text entry fields and buttons at the top, and an area below the search bar where content (i.e., the content returned as a result of a search) is to be displayed. This process can continue with the definition and hierarchical nesting of even lower-level patterns.

The user interface 100 shown in FIG. 1 illustrates an example of a pattern-based user interface. The user interface 100 has a floor plan that includes an object identification pattern (OIP) 105 and two object data patterns (ODPs) 110 and 115. Object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements. Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

Figure 2:
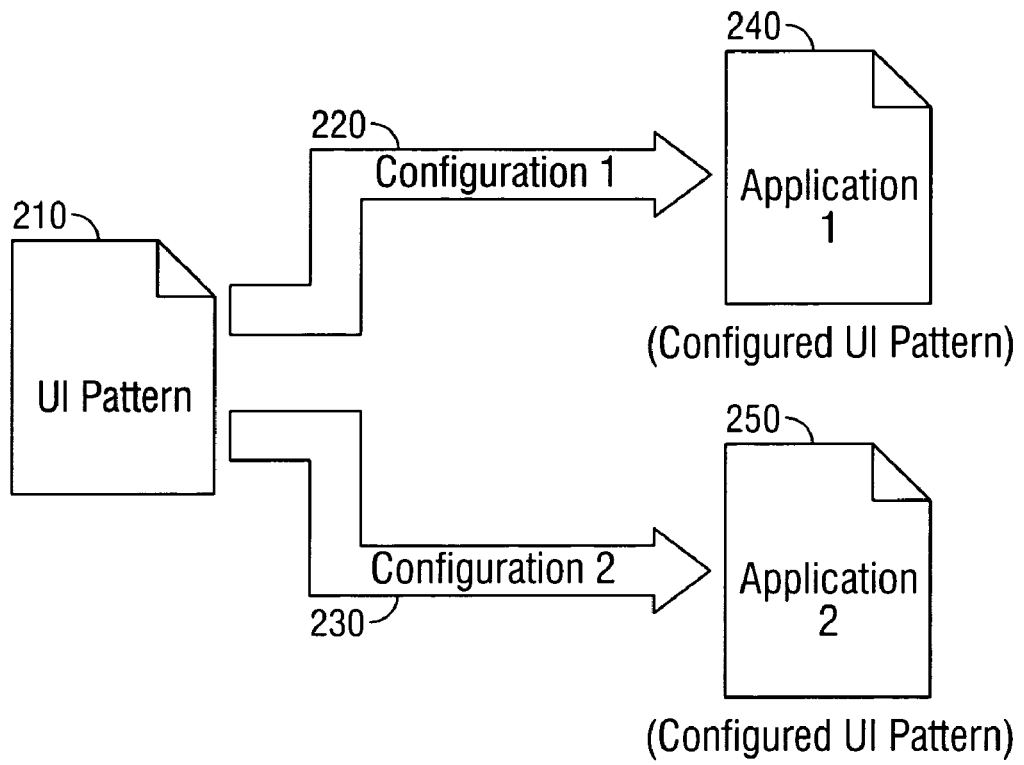
FIG. 2 is a block diagram illustrating the configuration of a UI pattern.

User interface 100 of FIG. 1 illustrates a particular application that is based on the patterns described above. Such an application can be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying properties of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, ENTERPRISE JAVA BEANS (EJBs), Business Application Programming Interfaces (BAPIs) developed by SAP, and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the pattern).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done through the use of a configuration application, such as a visual modeling program. A configuration application facilitates the process of configuring a UI pattern. In one implementation, the configuration application displays multiple configuration options for the application developer to select. The configuration options can include lists of the available back-end systems, queries, query fields, and query results.

Selections of configuration options can be stored as configuration data for a UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

Configuration data can also include customization data for one or more of the UI elements in a UI pattern. Customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
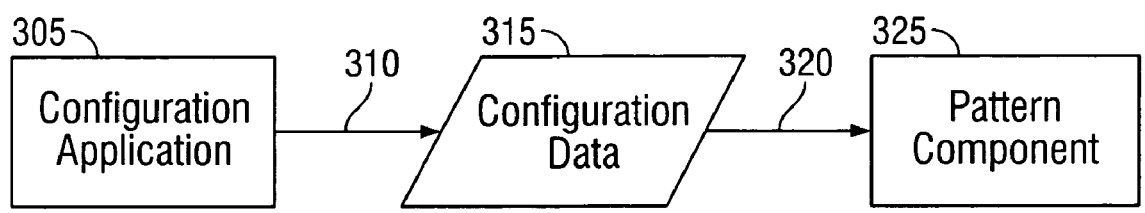
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

Figure 4:
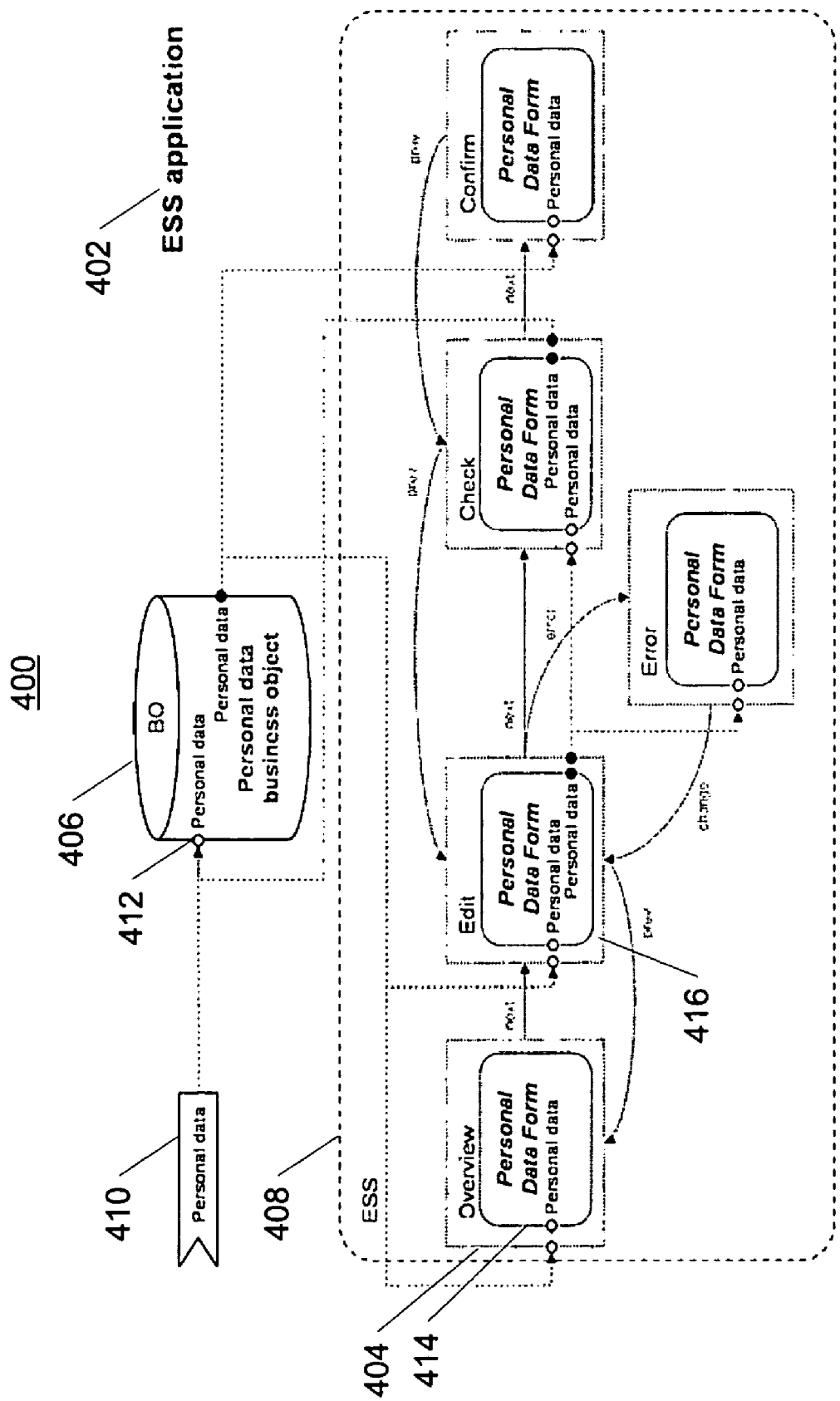
FIG. 4 is an illustration of an application being developed is a visual modeling program.

FIG. 4 is an illustration 400 of an application being developed is a visual modeling program. The illustration 400 is a graphical representation of an ESS (Employee Self-Services) application 402 in a visual modeling program. The visual modeling program allows users to generate applications based on a combination of patterns (graphical representations of entities for an application being developed). The visual modeling program includes a set of patterns that are provided to a user and define entities of a composition language. The composition language defines how applications can be developed in the visual modeling program. Thus, the base set of patterns can be considered building blocks for developing an application in the visual modeling program.

In the composition language, there are different types of entities that have different semantics and syntax, as represented by different patterns and types of patterns in a visual modeling program. The illustration 400 includes several different types of patterns, including patterns for scenarios, services, states, ports, plugs, and interactors (i.e., different patterns for different types of entities, including scenarios, services, etc.). Scenarios, such as the Overview scenario 404, are entities that represent a reusable user interface unit of an application being developed (e.g., a tab in a user interface of a web application). Services, such as the BO service 406, are entities that need not have a visual representation in an end-user application (e.g., in an application developed in the visual modeling program) and provide data to other components of an end-user application (e.g., a service that, in response to receiving a selection of personal data as search criteria, outputs personal data matching the search criteria). States, such as the ESS state 408, define visual states of a scenario by defining elements that are visible to an end-user of an application being developed (e.g., by encapsulating scenarios to be displayed). Ports, such as the Personal data port 410, can be connection points to and from entities in the modeling language (e.g., a connection point between a service and an interactor). Plugs, such as the Personal data plug 412, can be external representations of ports of a component (e.g., if the BO service 406 were drilled down, the Personal data plug 412 can be a port). Interactors, such as the Personal Data Form interactor 414, can be an atomic unit of user interaction (in the visual modeling program, such that the visual representation can not be drilled down to another level of entities), where an interactor can obtain and provide data by transforming input data into output data based on user interaction (e.g., the interaction of an end-user of an application being developed) (e.g., an interactor can be a form).

In the composition language, as reflected in a visual modeling program, the different types of entities have a different type of corresponding graphical representation. For example, interactors can have a graphical representation of a box defined by solid lines and rounded corners. As another example, a service can have a corresponding graphical representation of a cylinder.

The composition language can be defined to include certain entities that have associated semantics and syntax. For example, the composition language can be defined to include the Overview scenario 404 and the Edit scenario 416, each of which can have different semantics and different syntax, as defined by the composition language. The entities defined by the composition language can be referred to as base entities. These entities can be understood by the visual modeling program such that the visual modeling program can generate an associated runtime version of the entities. For example, by having a special generator that interprets Edit scenarios, a special generator can generate a runtime version of the Edit scenario 416.

Although certain types of entities are discussed with reference to FIG. 4, additional, different, or fewer entities can be used in a visual modeling program to represent different semantics and syntax of components of an application being developed.

Figure 5:
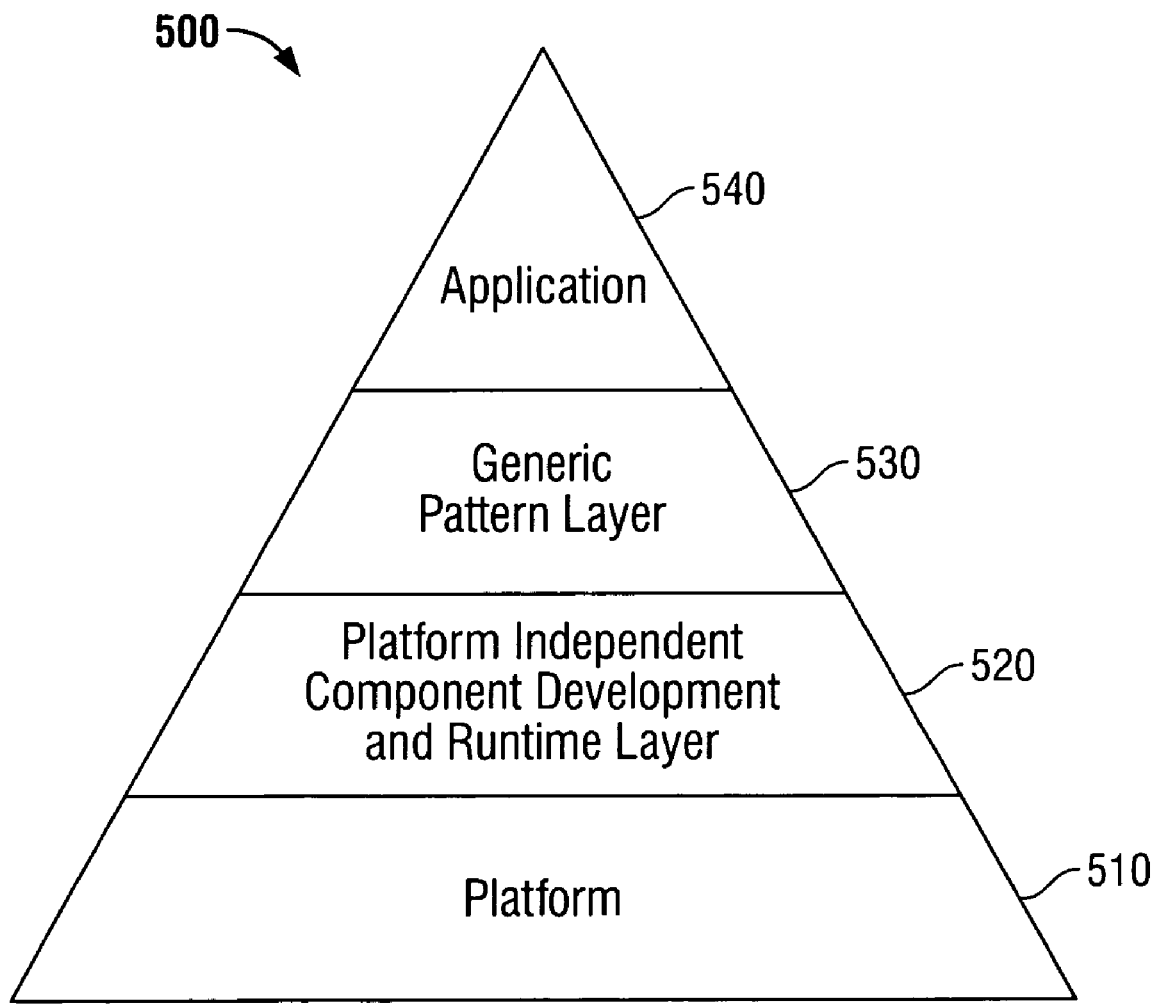
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the JAVA 2 PLATFORM, ENTERPRISE EDITION (J2EE), manufactured by SUN MICROSYSTEMS and the ADVANCED BUSINESS APPLICATION PROGRAMMING (ABAP)-based platform manufactured by SAP. The platform layer is generally chosen (or already established) by the enterprise that executes the applications and can be referred to as the technical platform layer.

To enable applications to execute on different platform layers 510, framework 500 includes a platform independent component development and runtime layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

The combination of components in the platform independent component development layer 520 can be referred to as a framework layer as it can provide a framework for interfacing between patterns in the pattern layer 530 and the technical platform in the platform layer 510. By defining this interface, the platform independent component development layer 520 can be used to define an implementation of a modeling language for a technical platform (e.g., a translation of entities of a model to runtime entities; whereas the pattern layer 530 provides designtime interfaces (e.g., patterns) for the modeling language entities).

In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides functionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern.

The top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer need not have advanced programming skills.

Figure 6:
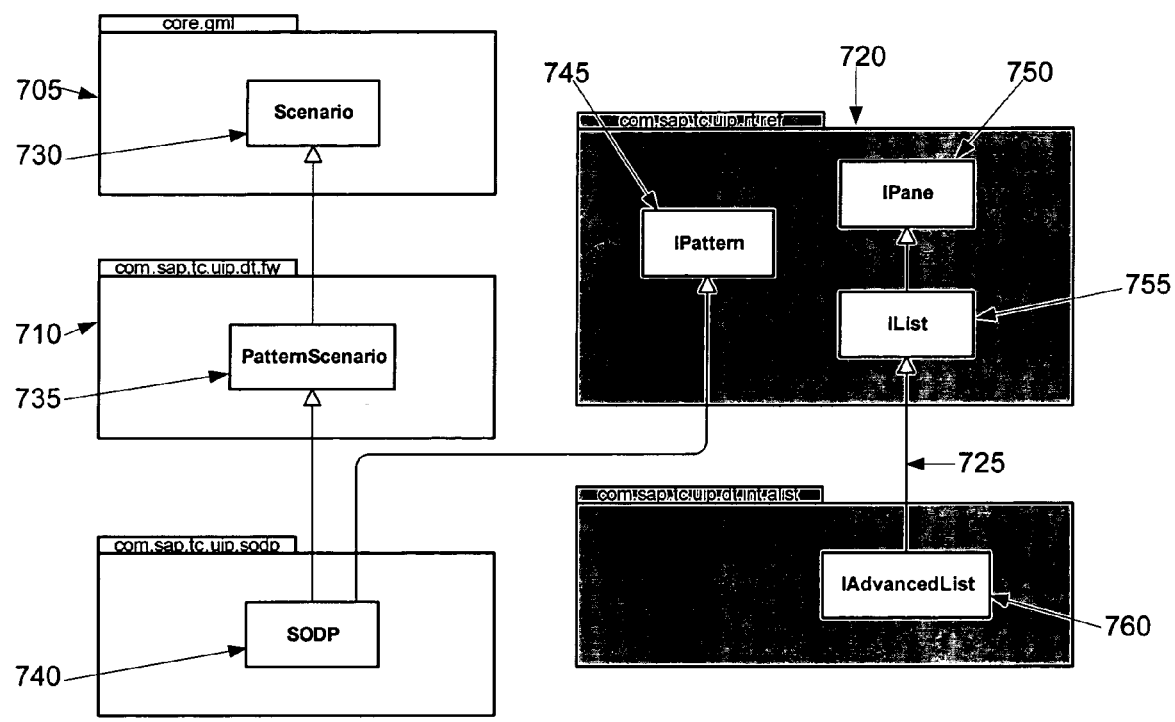
FIG. 6 is a diagram of relationships among components of a visual modeling language.

FIG. 6 is a diagram of relationships among components of a visual modeling language. A point of view for the components might be that of a pattern component developer (e.g., someone that develops patterns or pattern kits, rather than a developer of an application based on patterns). The components include foundational objects of a visual modeling language, interfaces for pattern components, and an additional pattern component. The foundational objects include objects that may form a basis for starting development in accordance with the modeling language. The foundational objects may include core objects, such as a "scenario" object definition 730 that defines a scenario (e.g., a basic object from which a business scenario may be defined), and designtime framework objects 710 (e.g., components of a designtime environment that may be used to build patterns), such as a scenario pattern framework object 735.

The interfaces for pattern components include basic interfaces 720 and an advanced list interface 760. The basic interfaces 720 are used as a basis from which further interfaces may be developed (e.g., a basic set of interfaces deployed with a visual modeling environment). The basic interfaces may include a pattern interface 745 ("IPattern"), pane interface 750 ("IPane"), and list interface 755 ("IList"). The advanced list interface 760 may be based on the list interface 755, as indicated by the inheritance arrow 725.

In general, interfaces for a pattern component may provide a description of computer methods that may be required to be implemented (e.g., in source code) by a pattern that implements the interface. For example, interfaces for pattern components may be similar to JAVA interfaces, except that interfaces for pattern components may be limited to methods and might not include use of variables.

As an example, the list interface 755 may include a method "retrieveListItems," which is specified to return a list of items of an instance of a designtime component. A pattern that implements the interface, such as a pattern named "pullDownMenu," which has a pull-down menu of choices, may be required to implement a method named "retrieveListItems" and return a list of items as a consequence of implementing the list interface 755. If an instance of the pullDownMenu pattern is generated, that pattern may be referred to by an instance of the list interface and methods of the interface may be called based on the reference to the interface name. For example, for an instance of the "IList" interface named List, List may be used to refer to the interface and an instance of the pullDownMenu may be referred to by the List instance (e.g., if a method uses interfaces rather than objects that implement interfaces to refer to instances of components). Also, the method retrieveListItems may be called from the List instance to call the method implemented by the pullDownMenu pattern (e.g., List->retrieveListItems may be used to call a retrieveListItems method implemented for the pullDownMenu pattern).

Advantageously, interfaces may provide a mechanism for polymorphism in a visual modeling language, such that late-binding may be offered for pattern development, which may assist application development. For example, an interface, and a first pattern that uses the interface to refer to patterns that implement the interface may be developed. The first pattern may refer to the patterns without having to refer to a specific type of pattern, such that new patterns that implement the interface may be developed and the first pattern need not be changed to adapt to the new patterns.

Interfaces may be implemented by patterns that are inherited by other patterns. For example, the SODP pattern component 740, which may refer to a pattern component for "Service Oriented Design Patterns" (e.g., patterns that implement services), may be a pattern that is inherited by patterns that represent a service. The SODP pattern component 740 may implement the pattern interface 745, such that all methods of the pattern interface 745 are implemented by the SODP pattern component 740. Service patterns that inherit the SODP pattern component 740 may inherit methods that are implemented for the pattern interface 745. As an example, if a service "search service" inherits the SODP pattern component 740, the search service pattern may inherit methods referred to by the pattern interface 745 and implemented by the SODP pattern component 740.

Although interfaces may be referenced in a user-environment of pattern development, the late-binding of patterns that are referenced as interfaces may occur in response to an end-user application developer causing a designtime version of an application to be compiled to a runtime version of the application. Thus, application developers may have different configurations of visual modeling environments that include different patterns and the different patterns may be referenced by interfaces (and methods of patterns may be referenced by methods of interfaces).

To implement interfaces in a JAVASCRIPT-based modeling language, prototypes may be used. For example, one or more interfaces may be defined as prototypes and a pattern, defined as a class, may have one or more interfaces attached to the class.

Figure 7:
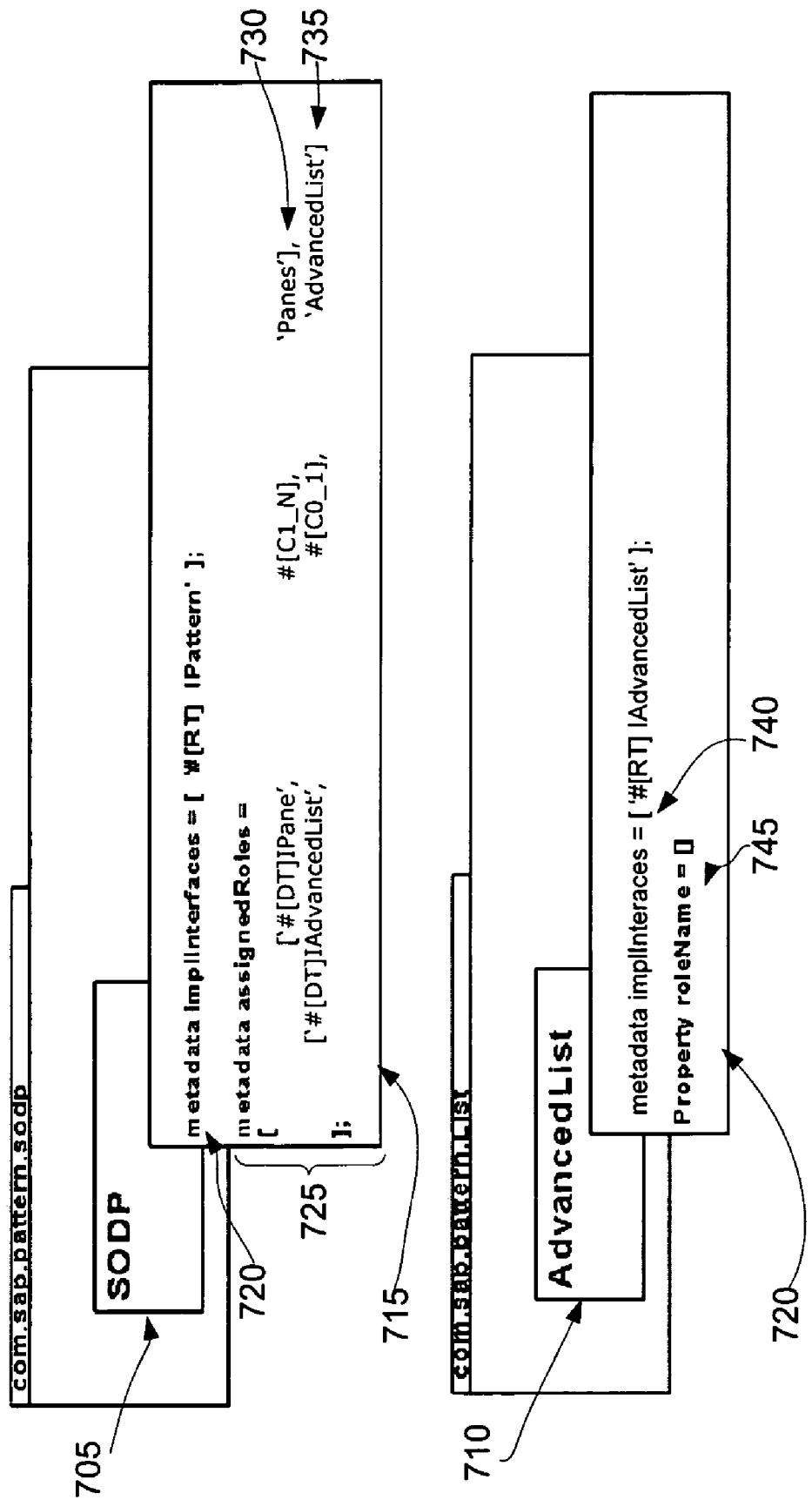
FIG. 7 is a diagram of pattern components.

FIG. 7 is a diagram of pattern components. In general, the diagram may illustrate how interfaces and roles may be implemented in a definition of a pattern component. Interfaces of FIG. 7 may be the same as interfaces described with reference to FIG. 6, where an interface may represent a polymorphic construct for a visual modeling language. Roles may be a construct of a visual modeling language that allows a same pattern component to have different semantic behavior depending on a role assigned to a pattern component. For example, a pattern component may be defined with potential assigned roles and, based on an assignment of one of the potential assigned roles, the semantic behavior of a pattern component may differ.

The pattern components of FIG. 7 include an SODP pattern component 705 and an AdvancedList pattern component 710, which have respective definitions 715, 720. The SODP pattern component 705 implements an interface named IPattern as shown by the first line of the definition 715 of the SODP pattern component. In addition, the SODP pattern component 705 has two assigned roles 725, including a role 730 named Panes and a role 735 named AdvancedList.

Each of the assigned roles 725 includes cardinality information that characterizes a cardinality of child components of the pattern that may implement an interface. For example, the Panes role 730 includes information that characterizes that one or more child components may use the interface IPane, as indicated by line including "IPane', #[C1_N]," where, C1_N characterizes a cardinality of 1 to n. The cardinality information may act as a limit for an amount of components that may be a child of the pattern component. For example, the AdvancedList role 735 is indicated as having a cardinality of 0 or 1 for the interface IAdvancedList. Thus, a number of components (e.g., patterns) that are children of an instance of the SODP pattern 705 may be limited to 1, such that two components that implement the interface IAdvancedList might not be children of the instance.

A role may be assigned to a child component based on the assigned role of a parent pattern component. For example, if an instance of the AdvancedList pattern component 710 were a child of an instance of the SODP pattern component 705, the instance of the AdvancedList pattern component 710 may be assigned the AdvancedList role 735 (e.g., by setting the roleName property 745 to include "AdvancedList"). This assignment may be based on the association of the AdvancedList role 735, in the assigned roles 725 of the SODP pattern component 705, with the IAdvancedList interface, which is implemented by the AdvancedList pattern 710 (as shown by the association 740 of the AdvancedList pattern 710 with the AdvancedList role).

Based on the assignment of a role, semantic behavior may differ. For example, functionality of the AdvancedList pattern component 710 may differ based on whether an instance of the AdvancedList pattern component 710 is assigned the AdvancedList role or another role. Roles may be assigned in ways that differ from an assignment based on assigned roles of a parent object. For example, the assigned roles 725 of the SODP pattern 705 may be defined by default (e.g., in source code of the pattern component as a default assignment of roles). As another example, a series of dialogue boxes (e.g., a wizard) may be presented to a user developing an application using pattern components, and, the user may be able to select roles to assign to a component through the dialogue boxes. As another example, a palette of a visual modeling tool from which a user may choose a pattern may have different roles of a pattern component visually separated (e.g., a pattern having two potential roles may have a first representation for the first role and a second representation for the second role; e.g., the palette may group patterns of a same assigned role together).

To implement semantic behavior associated with a role, methods of a role may have functionality that depends on a role assigned to an instance of a pattern component. The differing functionality may be implemented by determining an assigned role of a pattern component, and performing operations (or not performing operations), based on one or more assigned roles of an instance. For example, the SODP pattern component 705 may be include a method described with the pseudo-code:

```
Class SODP
  override method getConfigurationItemType (element)
    var role = element.getProperty('roleName');
    if (roleName=='Panes') {
      return '#NS[CustomConfigItem]';
      break;
    }
    return '';
  end
```

According to that pseudo-code, the method getConfigurationItemType may have a particular behavior if the role Panes is assigned to an instance of the SODP pattern component. In particular, the code "return '#NS[CustomConfigItem]'" may be executed, whereas, it might not otherwise be executed.

Roles may be advantageous as, rather than having code that depends on specific pattern components, the code may depend on a role of a pattern component and new pattern components may adopt those roles, such that the code that depends on an assigned role need not change. For example, the following pseudo-code defines that if a pattern component that calls an event listener is a pattern referred to as an SODP, OSP or PatternAttachment pattern, the pattern cannot be detached (e.g., certain functionality is prohibited):

```
$ENV.defineListener({type:'canDetachElement', func:function(evt) {
    if (evt.object.isa('SODP') || evt.object.isa('OSP') ||
evt.object.isa('PatternAttachment')) {
        WRITE("Can't detach this element from state");
        return false;}
        return true;}});
```

In that code, if a pattern component is introduced that should also not be detached, the above code must be changed. However, if roles are used, the code may be adopted for roles such that the code need not change if new components are introduced that have a same role and a standard way to determine a role exists. For example, the following pseudo-code may perform similar functionality:

```
Class SODP inherit #[BASE]:PatternScenario;
implement #[API]:IPattern
metadata assignedRoles = [
    ['in', '0__N', '#[BASE]:IPatternInport'],
    ['Tabs', '0__N', '#[API]:IPane, #[API]:IPlugin'],
    ['out', '0__N', '#[BASE]:IPatternOutport'],
    ['Service', '0__N', '#[API]:IService']
];
override method canDetachElement(object, state)
if (object.getProperty('roleName') == 'Tabs') {
WRITE("Can't detach this element from state");
return false;
}
return true;
```

In that example, in the method canDetachElement of an SODP pattern component, the role 'Tabs' determines whether a child pattern component is to be prohibited from being detached. If pattern components having the role 'Tabs' are introduced into the visual modeling environment (e.g., if a child component implements the interface IPlugin), the same operations may be performed and the code need not be changed (e.g., a role of the new pattern may also be determined from a method object.getProperty('roleName')). To ensure a compliant format for determining a role, the interface to which a child component implements may include a standard function, such as getProperty() that returns a name of a role for a property 'roleName.'

A development framework that implements support for interfaces, roles, or both, may be structured to support plug-ins, also referred to as kits. A kit may be a reusable module that includes information for pattern components, such as designtime information for display and use of an item, and information for generating a runtime version of a pattern component.

In such a framework, all pattern components may be implemented as kits, including all designtime visual information. This information may include, as an example, a configuration of a drilled-down version of a pattern component. For example, when a designtime pattern component is opened (e.g., a scenario pattern component is drilled down), the visual component may configure the associated design-time environment. Advantageously, this may simplify work for kit development and maintenance, because where and how to make changes to reach a desired effect may be intuitively clear for a developer (e.g., in a kit associated with a pattern component).

In addition to having kits that are specific for a pattern component, separate kits may exist for initialization logic and context-specific constraints. For example, default diagrams of a pattern component may be displayed, if no pattern-specific diagrams exist. As another example, context-specific constraints may be set for pattern component that is drilled-down (e.g., a restriction prohibiting dragging and dropping a component to a component drilled-down may be set). Advantageously, kits for default initialization logic and context-specific constraints may be reused for different patter components. Similarly, as pattern kits need not have initialization logic or logic for context-specific constraints, same kits may be used across various floor plans that have different initialization logic.

In addition, a pattern base kit may be introduced between core classes and concrete kits. This layer may contain implementations of major super classes and implementation of support for roles and interfaces. This layer may allow kits to remain less dependent on changes in a core and simply kits, as it may contain implementations of many generic functions that may be used by kits.

Figure 8:
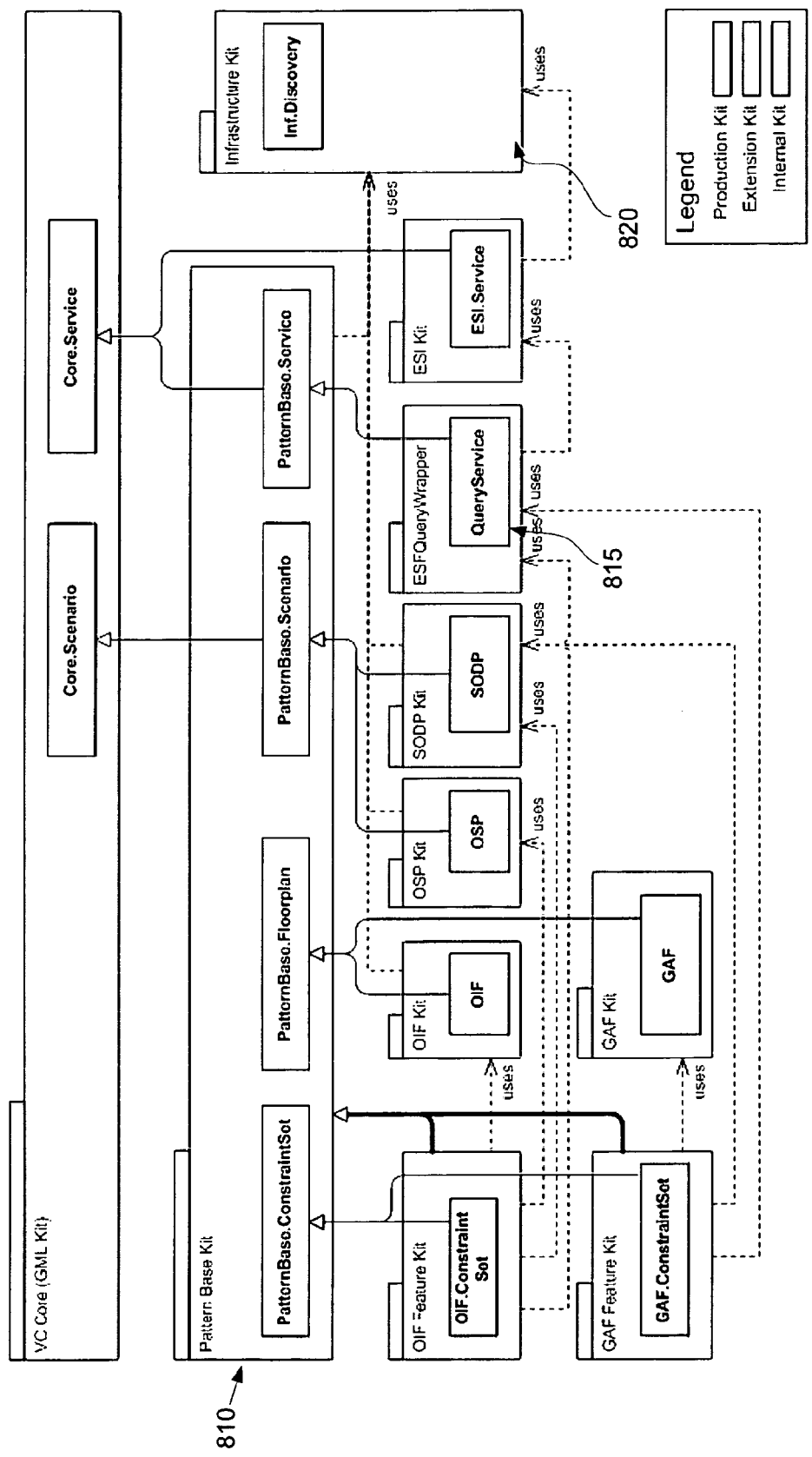
FIG. 8 is a diagram of a structure of kits.

FIG. 8 is a diagram of a structure of kits. The structure of kits may be used to have an extensible visual modeling environment that supports interfaces, roles, or both. In the diagram, arrows represent dependencies between kits.

In that diagram, there exist various types of kits. These types are used for different purposes, including a production kit, internal kits, and extension kits. For example, there is a production kit, referred to as the pattern base kit 810, which may provide generic functions that can be used by various pattern components. It may be considered a production kit as it may be included for all visual modeling environments and may be relied upon to develop patterns. The internal kits include pattern components, services (e.g., the query service 815), and the like. Other kits may include extension kits, which may be used to support additional features (e.g., a set of functionalities), such as constraints.

Aspects of the structure of kits may include patterns being separated from features (e.g., new features). For example, pattern kits are separate from extension kits that include features, such that a selection or de-selection of features is not longer related to a kit implementing specific pattern internal functionality, but rather each extension kit represents a set of features and constraints as a whole, which can either be enabled or disabled. Other aspects may include an infrastructure kit 820 dedicated to providing services to kits that are not directly related to services of pattern components.

Figure 9:
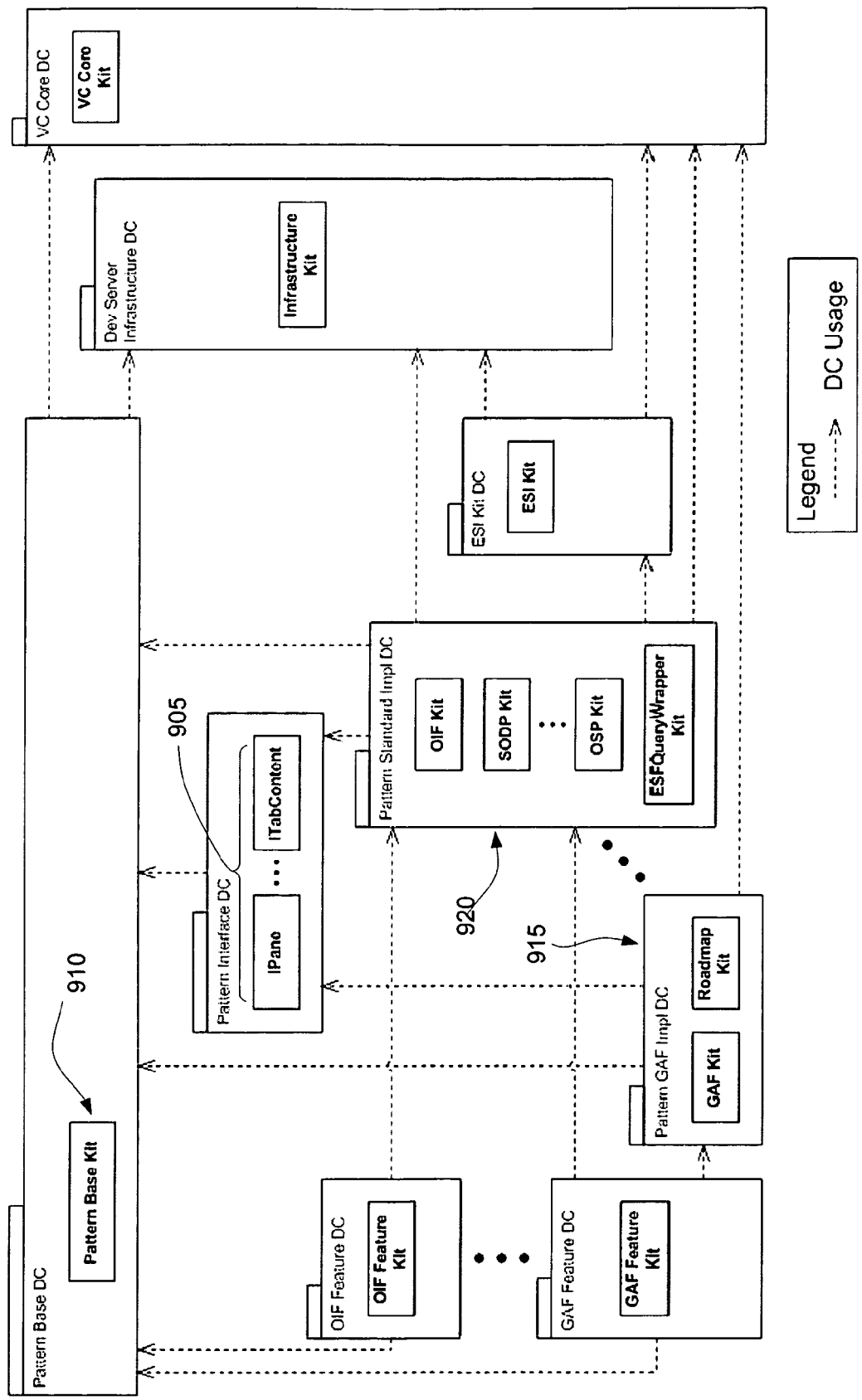
FIG. 9 is a diagram of a development component structure including a pattern interface development component between a pattern base kit and pattern kits.

To implement interfaces an interface kit may be used that is depended upon by pattern kits. For example, all pattern kits may be required to implement an interface, and, interfaces may be provided through an interface kit. FIG. 9 is a diagram of a development component structure including a pattern interface development component (including interfaces 905) between a pattern base kit 910 and pattern kits 915, 920. The pattern interface kit 905 may be an internal kit that contains interfaces that correspond directly to runtime interfaces, and design time interfaces that are required for designtime purposes. Runtime interfaces that are defined by other runtime components may be separated into another internal kit that is its own development component. The kit structuring allows pattern kit developers to separate initialization logic and context-specific constraints logic into feature kits (or its internal kits). Thus, main logic of kits may remain reusable in other floor plans, as there may be no dependency on external constrains introduced by floor plan where it is used and no dependency on internally used kits.

To implement additional features, through feature kits, the following separation of logic may be used. A feature kit may be used to define a set of kits required to allow modeling a specific feature. For feature kits, the above-described distinction between types of kits may be used, including extension kits, internal kits, and production kits. In that distinction, the extension kits may be used to add features, such as a new floor plan (e.g., by adding a new extension kit).

A production kit may represent a model type in a model creation dialog in visual modeling tool. For example, only one model type may exist for modeling of a composed pattern. Consequently, only one production kit may exist (e.g., the pattern base kit). Once a model type is selected in the model creation dialog, a list of features (e.g., extension kits of the selected production kit) may be displayed for selection. A user (e.g., a developer of an application using pattern components) may specify a list of features they plan to use, without directly referencing internal kits.

Constraints may belong to extension kits, such as feature kits, and they may also be placed in separate internal kits. For example, constraints may be placed in separate internal kits if they are planned on being reused for different model types (e.g. different pattern components). An extension kit of constraints may be defined for each floor plan.

To deploy features individually, extension kits may be defined in separate development components, which might not contain internal kits. The extension kits may be similar to an envelope around kits that contain logic, but no patterns. An internal kit may be used many times by different extension kits.

Dependencies between kits may be declared and conventions may be required to prevent implicit dependencies (such as reacting to an event of a kit to which no dependency has been modeled). A feature kit might not contain any class of its own. It might simply work as an umbrella that bundles many internal kits together to one (e.g. as a floor plan).

Initialization logic may be executed when an instance of a component (e.g., a pattern) is generated. As patterns are interrelated, it might not be acceptable to simply put initialization logic in a class of a modeling language that defines a component. For example, in some instance, initialization may differ in different use cases (e.g. in different floor-plans). By bundling a feature kit with initialization, features necessary for initialization may be available. Initialization may be separated by having a standard method call overridden in initialization logic and having that logic registered as an event handler. For example, a method may have a standard name of create, and, that method may be registered with a system registry as an initialization handler for a floor plan object. Thus, the method may be called when a new floor plan is to be initialized and the initialization logic that may be imported through a feature kit may be separated from the component that is to be initialized.

To define constraints on how elements may be connected, e.g., how a search service pattern may be connected to search form but not to other components, constraints based on roles may be defined in every element. This may be implemented as a constraint handler. For example, the following pseudo-code may show how a constraint handler is implemented to restrict connecting of items by roles:

```
Class SearchRoleConstraintHandler
    inherit com.sap.tc.UIP.dt.base:RoleConstraintHandler
    constructor( )
    this.roleLinkDefinition = [
    {srcRole:"SearchFrm", trgRole:"Service"},
    {srcRole:"Service", trgRole:"OUT1"}];
    end
    override method isAllowed(role, unit)
    if(role=="SearchFrm") return false;
    this.supercall(role, unit);
    end
```

Similar to initialization logic, constraints handlers may be defined in kits that are separate from components, such as patterns. To allow constraint handler logic to be handled, constraint handlers may be registered with a system and the registry may be used to determine a proper constraint handler to call. A standard name for constraint handlers may be used such that an appropriate constraint handler may be referenced easily (e.g., all constraint handlers may have a method name registerRoleConstraintHandler that takes an argument 'class name' corresponding to a component to have constraint logic).

Figure 10:
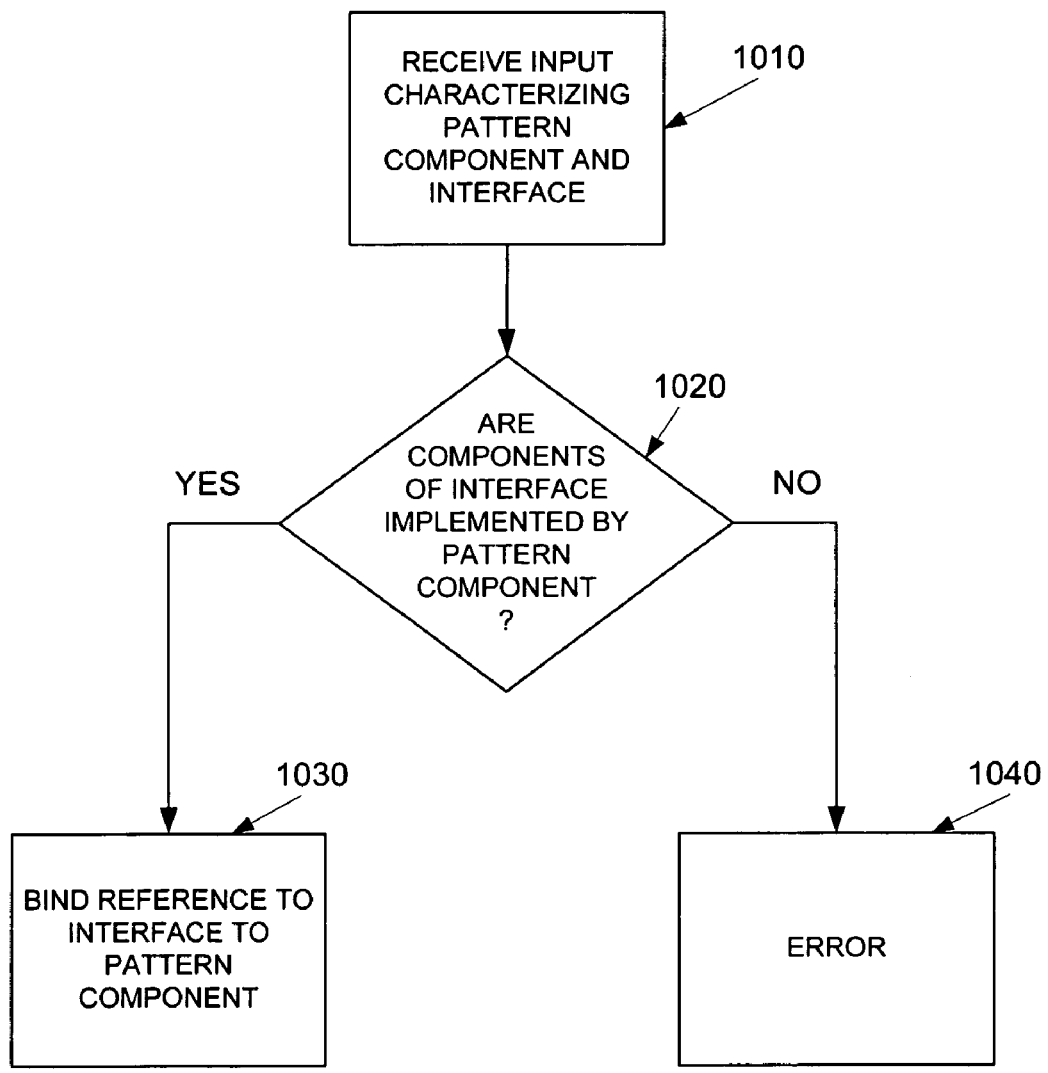
FIG. 10 is a flowchart illustrating a process of supporting interfaces.

FIG. 10 is a flowchart illustrating a process of supporting interfaces. In general, a pattern component may implement an interface. If the interface is implemented, an instance of the interface may act as a reference to the pattern component (e.g., via a binding of an implementation of the components of the interface to the reference). For example, runtime objects comprising the pattern component and implementations of the interface components may be generated and references to those components in source code may be treated as references to those implementations. If a pattern component does not implement an interface, an error may be raised.

Input characterizing a pattern component and an interface may be received (1010). The input may include source code defining a pattern component, indicating that the interface is implemented by the pattern component, and defining the interface. The interface may include one or more methods that are to be implemented by any pattern component implementing the interface.

A determination is made as to whether the components of the interface are implemented by the pattern component (1020). For example, the interface may include several methods and the determination may include determining whether those methods are implemented by source code of the pattern component (e.g., having same names, same arguments, and the like).

If the components of the interface are implemented by the pattern component, a reference to the interface is bound to the pattern component (1030); otherwise, an error may be raised (1040). Binding the reference to the interface to the pattern component may include, compiling source code referencing the interface with the source code implementing the interface (e.g., compiling the implementations of the pattern component in lieu of the references to the interface). An error may notify a user that an interface was not implemented.

Figure 11:
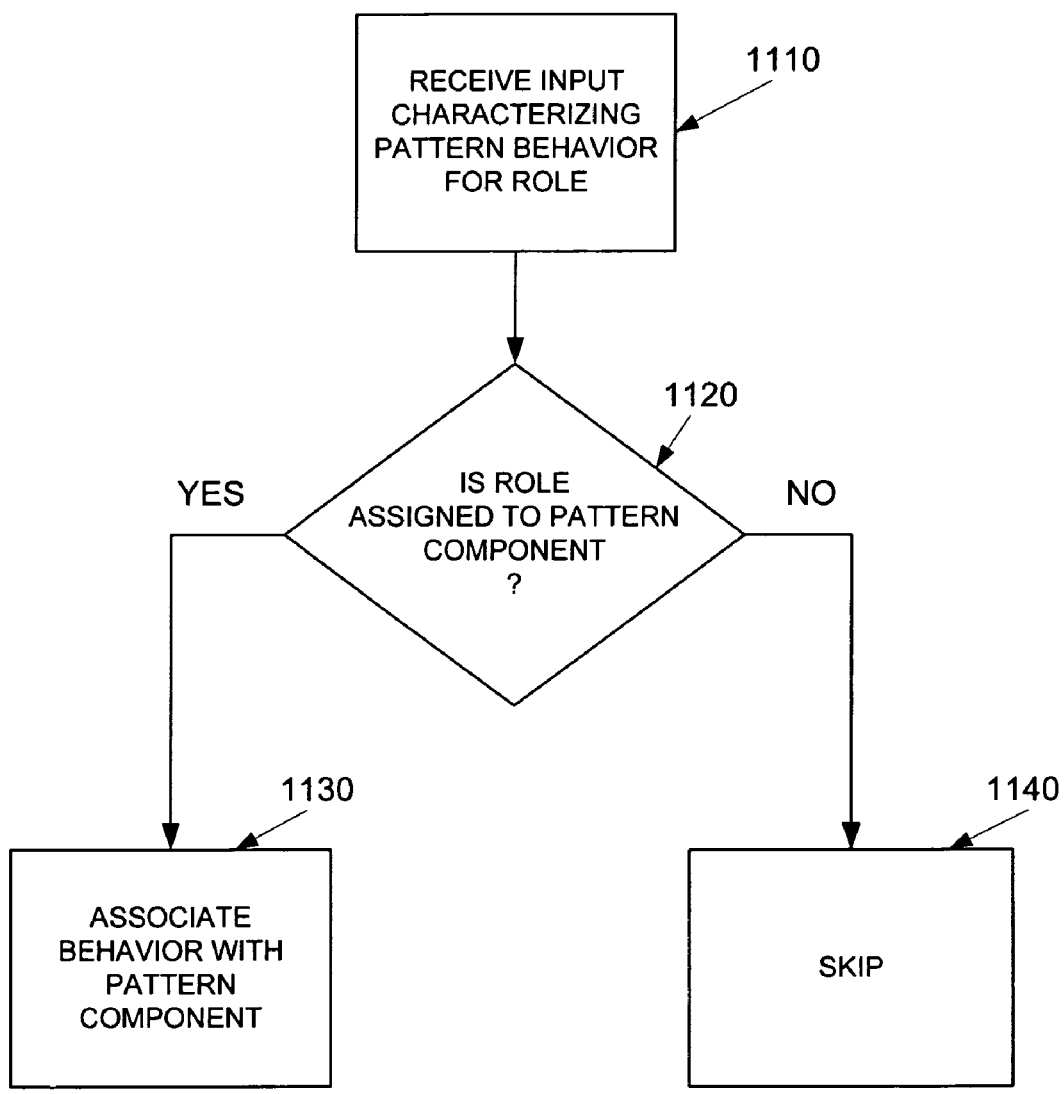
FIG. 11 is a flowchart illustrating a process of supporting roles.

FIG. 11 is a flowchart illustrating a process of supporting roles. In general, the process involves associating a behavior with a pattern component depending on a role of a pattern component. Input is received that characterizes pattern behavior for a role (1110). The input may include source code of a pattern component that characterizes behavior for that role that depends on an assigned role of that pattern component or another pattern component. For example, the input may include source code of a pattern component that indicates an operation is to be performed if an assigned role of a child component is a particular role.

A determination is made as to whether the role is assigned to a pattern component (1120). For example, a determination may be made as to whether a pattern component is assigned a role that is associated with the behavior of 1110. For example, an "if" conditional statement may indicate that if a child component has a role "detachable," a behavior allowing the component to be detached may be performed. Then, a check may be made of a property "assignedRole" to determine if a child component has the role "detachable."

A combination of different types of support may be used to assign a role to a pattern component and a pattern component may be assigned any number of roles (e.g., zero, one, or multiple roles). For example, one type of support may include receiving a selection of a role in an end-user application development environment in a dialogue box that allows for an assigned roles property to be set. As another example, when compiling a pattern component, an interface implemented by a pattern component may be used to determine a role to assign. For example, if a pattern component is a child component of another component, the child component's interface may be used to determine a role that may be assigned based on a listing of interfaces and associated roles to assign in the parent component (e.g., as described above in example pseudo-code).

If a role is assigned to a pattern component, the behavior may be associated with the pattern component (1130); otherwise, it might not be associated with the pattern component (1140). For example, a behavior may be associated with a pattern component by including code corresponding to the behavior in a runtime version of the pattern (e.g., in a late-binding of code to pattern components) to be included in an application. Not associating the behavior may include doing nothing (e.g., such that code corresponding to the behavior is not included in a runtime version of the pattern component), setting a property to indicate the behavior is not to be performed, and the like.

In variations, additional, different, or fewer operations can be performed in the processes of FIGS. 10 and 11. For example, in the process of FIG. 10, a pattern component may implement multiple interfaces and determinations may be made as to whether all the interfaces are implemented.

Figure 12:
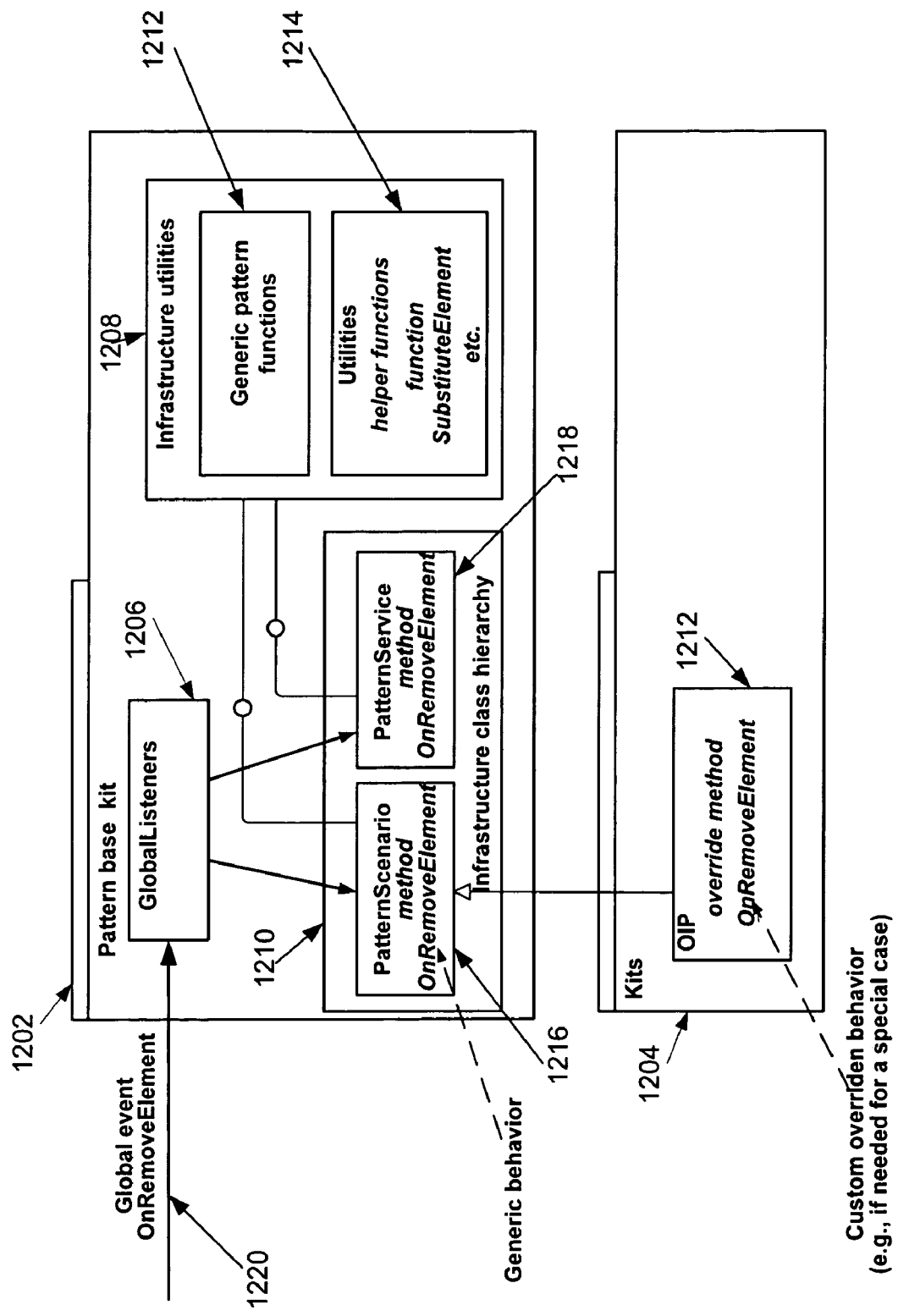
FIG. 12 is a diagram of a pattern base kit and pattern kits.

FIG. 12 is a diagram of a pattern base kit 1202 and pattern kits 1204. The diagram may represent a designtime architecture for implementing pattern kits 1204, where the pattern kits 1204 use functionality from a pattern base kit 1202, which may include generic functions that may be used by various pattern kits 1204. In general, patterns may be implemented as kits, which may be plug-ins that include various aspects of a pattern, such as a designtime representation of a pattern and a generator for a runtime version of a pattern.

The pattern base kit 1202 includes global listeners 1206, an infrastructure class hierarchy 1210, and infrastructure utilities 1208. The global listeners 1206 listen to events related to patterns and assist in resolving the event. For example, an OnRemoveElement event 1220 may be generated in response to a pattern being removed from a diagram representing an application being modeled in a visual modeling environment. To assist in resolving events, the global listeners 1206 may determine a service to call that is associated with the type of event. For example, an OnRemoveElement event 1220 from a pattern named OIP may be an OnRemoveElement type of event and one of the global listeners 1206 may cause a service to be initiated that will resolve the event.

Services that resolve an event related to a pattern may be generic, in the sense that a same service may resolve events from multiple types of patterns, or specific, in the sense that a service resolves an event for only one type of pattern. Generic services to resolve pattern kit events may be default services, such that on an occurrence of an event, the generic service may be called to resolve an event unless a specific service exists that overrides the generic service.

The global listeners 1206 may determine whether a generic or specific service is to resolve an event by determining whether a kit associated with a pattern related to an event has a service that overrides a generic service. For example, one of the global listeners 1206 may receive an OnRemoveElement event 1220 from an instance of an OIP pattern. Then, the global listener may determine whether an OnRemoveElement method is implemented in an OIP kit 1212 (e.g., whether a method having a same name exists). In response to the method being overridden, the specific service of the OIP kit 1212 may be called to resolve the OnRemoveElement event 1220. Also, the global listeners 1206 may determine a generic service that is associated with an event. For example, an event may come from an instance of an OIP pattern 1212. A global listener may determine that one of a generic service to handle the event may be implemented in the PatternScenario pattern 1216, as the OIP pattern 1212 depends on the PatternScenario pattern 1216 (e.g., and not the PatternService pattern 1218).

The infrastructure class hierarchy 1210 includes patterns from which the patterns in the kits 1204 depend (e.g., by having an inheritance relationship with classes in the class hierarchy 1218). For example, the OIP pattern 1212 may depend on the PatternScenario kit 1216.

The patterns in the pattern base kit include implementations of generic services (e.g., services that may be used by multiple types of patterns). For example, the PatternScenario pattern 1216 includes a generic service for the OnRemoveElement event, which may be a default, generic service for all patterns in pattern kits 1204 that depend on the PatternScenario pattern 1216, such as the OIP pattern 1212. As another example, the PatternService pattern 1218 includes a similarly named method OnRemoveElement, however, since the OIP pattern 1212 does not depend on the PatternService pattern 1218, the generic service of the PatternService pattern is not used by the OIP pattern 1212 and does not conflict with the OnRemoveElement method of the PatternScenario pattern 1212.

The infrastructure utilities 1208 provide functionality that may assist the infrastructure class hierarchy 1218, such as functions that may be used by various patterns to perform tasks. For example, the infrastructure utilities 1208 includes generic pattern functions 1212 and utilities 1214.

Figure 13:
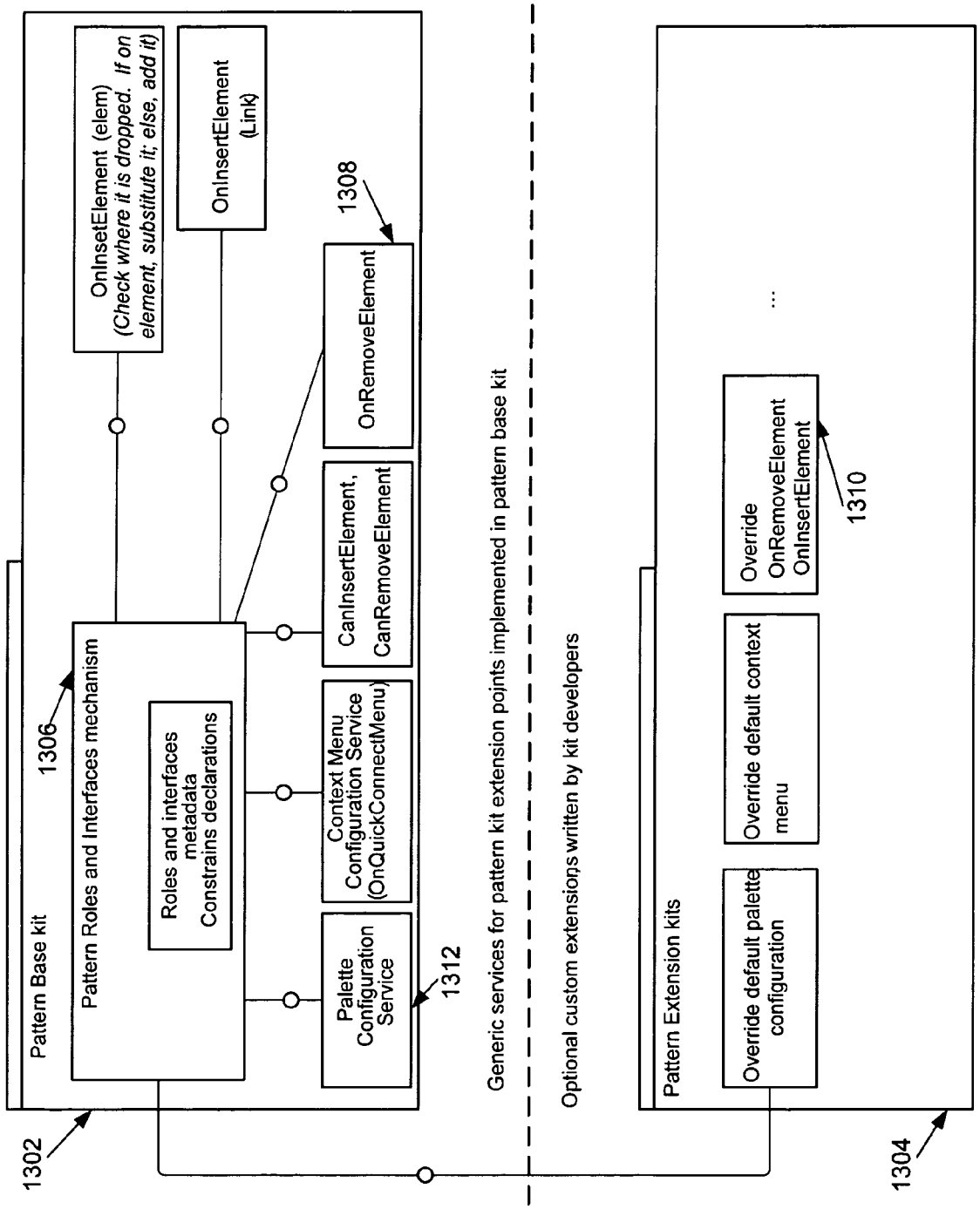
FIG. 13 is a diagram of a pattern base kit and pattern extension kits

FIG. 13 is a diagram of a pattern base kit 1302 and pattern extension kits 1304. Similar to FIG. 12, the patterns may be implemented in pattern kits and generic services may exist in a pattern base kit. In contrast to FIG. 12, the pattern base kit 1302 of FIG. 13 has generic services that are generic regardless of a type of pattern from which a pattern depends. For example, instead of there being an OnRemoveElement method for multiple patterns in a pattern base kit, there may be a single generic service for an OnRemoveElement event. For example, the pattern base kit 1202 has a method in the PatternScenario pattern 1216 and the PatternService pattern 1218; however, the pattern base kit 1302 has a single OnRemoveElement service 1308, which does not relate to dependencies of patterns.

Similar to the kits 1204, the pattern extension kits 1304 may include specific services related to override generic services. For example, the pattern extensions kits 1304 includes the OnRemoveElement specific service 1310, which may override the OnRemoveElement generic service 1308 for a specific pattern (e.g., an OIP pattern).

The pattern base kit 1302 also includes support for roles and interfaces 1306. Generic services in the pattern base kit 1302 may use support for roles and interfaces 1306 to assist in resolving events. For example, a palette of patterns may restrict use of patterns based on interfaces implemented by patterns and cardinality information (e.g., as described above). A generic service for each child pattern component, such as a generic service called palette configuration service 1312, may exist to assist in generating and maintaining a palette, and that service may reference cardinality information and information about roles stored in the support for roles and interfaces 1306 to determine how to restrict use of patterns based on interfaces.

As a more detailed example, to fill a palette generically, roles of a context unit (e.g., potential roles listed in a parent pattern component) may be used. From the roles information, information about interfaces of possible child pattern components and cardinality may be obtained. If an interface is listed, pattern components that implement the interface may be added to a palette. For example, if a role is defined to add only components that implement the interface IPane, then an implementation in the Storyboard may ask every possible component if it implements the IPane interface. If a pattern component does implement the interface, then the pattern component may be added to the Palette.

If cardinality of a role is 0_1 (i.e., zero or one elements may exist), then after one pattern component associated with the interface is added to a model of an application being developed, pattern components implementing the interface in a palette may become grayed-out and inactive. If such a pattern component is later removed from the model, the pattern component in the palette may become active again and a user may add it to diagram by a drag and drop operation.

Advantageously, a generic implementation of a palette may remove a need to write configure editors for every kit (e.g., for each pattern) for palette configuration and remove dependences between kits. When a new kit (e.g., with a new pattern) is implemented, a kit developer may decide which interfaces to implement, and based on this information the generic service may automatically configure a palette.

Implementation of connections between pattern components in a designtime environment may be simplified (e.g., connections between plugs). For example, roles and constraint information may be used to describe pattern components that may be connected in a context menu. For example, initialization logic and constraints may be separated in special feature kits that correspond to different floor plans (as described earlier). In the feature kits, constraints may be defined for a context menu. Patterns may override the functionality with a specific service.

The following code is an example definition of plug connections that may be made, that may be applied generically to various patterns in an SODP floor plan:

```
Class SODPRoleConstraintHandler inherit
com.sap.tc.UIP.dt.base:RoleConstraintHanlder
    Constructor( )
    This.roleLinkDefinition = [
    (srcRole: "in", trgRole: "Tabs"),
    (srcRole: "in", trgRole: "Service"),
    (srcRole: "Service", trgRole: "Tabs"),
    (srcRole: "Service", trgRole: "Service"),
    (srcRole: "Tabs", trgRole: "Out")]; end
```

In this example, each item in the roleLinkDefinition array may represent that a connection may be made from one type of source role to a type of target role. Based on this information, pattern components may be displayed on a context menu of connections if they implement a target role specified in a definition corresponding to a source role. For example, for an in-port with the "In" role, pattern components implementing the "Tabs" and "Service" roles may be displayed in a context menu. Thus, a context menu may be built generically, based on constraint declarations, and kit developers need not implement a specific context menu.

FIG. 14 is a pseudo-code example of a generic service for pattern components in a designtime environment. The code includes a declaration 1405 of a global event listener, some generic checks 1410, 1415, 1420, 1425 for the generic service, and calls a custom extension 1430, if it exists. The declaration 1405 defines a global event listener named "canRemoveElement" that may respond to canRemoveElement events, which may be called to determine whether a pattern component can be removed from a model of an application being developed (e.g., which may be called in response to a user-request to remove a pattern component from a model). The same listener may be used for a same type of event from different patterns.

A first check 1410 determines if a pattern component is the source of a link to a target pattern component and, if so, determines that the pattern component cannot be removed unless the target component is first removed (e.g., by checking whether a target implements the "PatternInteractor" interface).

A second check 1415 determines whether a pattern component has a role and, if not, allows the pattern component to be removed. For example, a pattern component with a role may have cardinality constraints that prohibit removal of the pattern component, but a pattern component without a role might not have any cardinality constraints that would prohibit removal. A third check 1420 determines that if a pattern component has a role with a minimum cardinality of zero, that the pattern component may be removed. A fourth check 1425 determines whether cardinality constraints of a role otherwise prevent removal (e.g., if removal of the pattern component results in fewer components than a lower bound of cardinality, the pattern component may be prohibited from removal). A custom extension may be called 1430, if it exists.

The example shows that a generic service may be implemented for a generic listener, and, the generic service may use interface, role, and cardinality information. For example, interfaces are used to determine if a pattern component has a target that implements a pattern interactor such that the target is to be removed prior to removing the pattern component (e.g., "if (target.is('#NS[PatternInteractor]'))").

Figure 15:
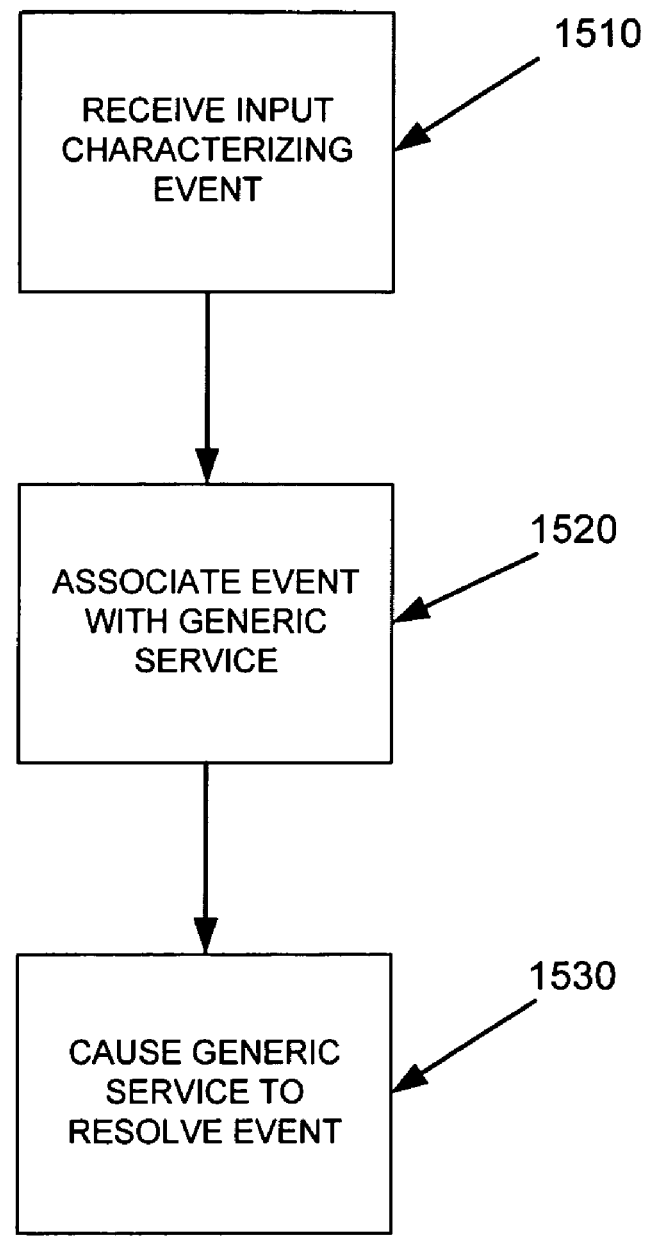
FIG. 15 is a flowchart illustrating a process of resolving events with a generic service.

FIG. 15 is a flowchart illustrating a process of resolving events with a generic service. Input characterizing an event is received (1510). The input may include user input causing an event listener to be called, an event object containing context information about an event, and the like.

An event is associated with a generic service (1520). The event may be the event of 1510. Associating an event with a generic service may include determining an appropriate generic service to resolve an event. In variations, a service that is not generic may be associated with an event if a generic service is overwritten for a specific pattern. In variations, an event may be tacitly associated with a generic service. For example, an event listener may be dedicated to resolving events to be resolved by a particular generic service, and, the call of an event listener for a type of event may be tacit association of the event with the generic service. As described above, a service may be generic in the sense that a same service may be used to resolve events for multiple patterns.

A generic service is caused to resolve an event (1530). For example, a method for a generic service may be called. As another example, a service may be provided by an event listener.

The process of FIG. 15 may be performed by an event listener, such as the event listener described in the pseudo-code of FIG. 14, another component of a designtime visual modeling environment (e.g., at a visual modeling tool that allows for configuration of patterns to model an application), or by a combination of components. For example, an event listener may be called and receive an event object including information about the event, the event listener may associate the event with an appropriate generic service, and the generic service may be called. As another example, an event may be received by a modeling tool, the tool may determine an event listener to provide a generic service, and the event listener may be called.

In implementations, a generic service may part of an event listener (e.g., an event listener may provide a generic service).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, tangibly embodied in non-transitory information carrier, the computer program product being operable to cause data processing apparatus to perform operations comprising:

receiving input characterizing a first event related to an instance of a first pattern component of a visual modeling language environment;

associating the first event with a service determined to be appropriate for a type of event associated with the first event;

causing the service to resolve the first event;

receiving input characterizing a second event related to an instance of a second pattern component of the visual modeling language environment;

associating the second event with the service, the second event being the same type of event as the first event;

causing the service to resolve the second event; and adding a third pattern component as a child to the first pattern component, the third pattern component being one of the child components supported by the first pattern component;

wherein the service:

determines child components supported by the first pattern component in response to the first event, configures a palette of pattern components to include child components supported by the first pattern component;

determines whether cardinality information of the first pattern component supports another third pattern component as a child, and if the first pattern component supports another third pattern component as a child, allows a user to add another third pattern component as a child to the first pattern component.

2. A computer program product in accordance with claim 1, wherein the first and second pattern components are implemented in kits having similar extension points, the service to resolve the first and second events from extension points of the first and second pattern components.

3. A computer program product in accordance with claim 1, wherein
the first and second events are received at an event listener that assists in resolving events of pattern component kits, each pattern component kit having a pattern component that may be added or removed from a visual modeling environment; and
the event listener references the service to assist in resolving the events.

4. A computer program product in accordance with claim 1, the operations further comprising:
receiving an indication of a first kit including the first pattern component, the first kit not including an event handler for the first event; and
integrating the first kit into the visual modeling environment.

5. A computer program product in accordance with claim 1, the operations further comprising:
receiving an indication of a first kit including the first pattern component, the first kit including code overwriting a second service for handling a third event, the second service being a generic service for handling the third event; and
integrating the first kit into the visual modeling environment.

6. A computer program product in accordance with claim 1, wherein the first event is received by a visual modeling tool in a designtime environment to develop an application using pattern components.

7. A computer program product in accordance with claim 1, wherein the first and second pattern components graphically depict entities of a visual modeling language.

8. A computer program product in accordance with claim 1, wherein the first and second pattern components are configurable and reusable units corresponding to tasks, the first and second pattern components having specific semantic meanings and defined interaction behaviors.

9. A computer-implemented event-listener to perform operations comprising:
receiving input characterizing events related to a plurality of instances of a plurality of pattern components in a visual modeling tool;
associating a type of event with a service to resolve the event, the service to resolve the event related to other instances of the plurality of pattern components; and
initiating the service to resolve the event,
wherein the service:
determines child components supported by a pattern component in response to another event, and
configures a palette of pattern components to include child components supported by the pattern component;
determines whether cardinality information of the pattern component supports another pattern component as a child, and if the pattern component supports another pattern component as a child, allows a user to add another pattern component as a child to the pattern component.

10. A computer-implemented event-listener in accordance with claim 9, wherein the pattern components are implemented in kits having similar extension points, the service to resolve the events from extension points of the pattern components.

11. A computer-implemented event-listener in accordance with claim 9, wherein the service is a default service; the operations further comprise determining whether a pattern component overwrites the service with a specific service; and the initiating the service comprises initiating the service if the pattern component does not overwrite the service, and otherwise, initiating the specific service.

12. A computer-implemented method comprising:
receiving input characterizing a first event related to an instance of a first pattern component of a visual modeling language environment;
associating the first event with a service determined to be appropriate for a type of event associated with the first event;
causing the service to resolve the first event;
receiving input characterizing a second event related to an instance of a second pattern component of the visual modeling language environment;
associating the second event with the service, the second event being the same type of event as the first event;
causing the service to resolve the second event; and
adding a third pattern component as a child to the first pattern component, the third pattern component being one of the child components supported by the first pattern component;
wherein the service:
determines child components supported by the first pattern component in response to the first event,
configures a palette of pattern components to include child components supported by the first pattern component;
determines whether cardinality information of the first pattern component supports another third pattern component as a child, and if the first pattern component supports another third pattern component as a child, allows a user to add another third pattern component as a child to the first pattern component.

13. A computer-implemented method in accordance with claim 12, wherein
the first and second events are received at an event listener that assists in resolving events of pattern component kits, each pattern component kit having a pattern component that may be added or removed from a visual modeling environment; and
the event listener references the service to assist in resolving the events.

14. A computer-implemented method in accordance with claim 12, the method further comprising:
receiving an indication of a first kit including the first pattern component, the first kit not including an event handler for the first event; and
integrating the first kit into the visual modeling environment.

* * * * *